United States Patent
Fino

(10) Patent No.: US 9,547,437 B2
(45) Date of Patent: Jan. 17, 2017

(54) METHOD AND SYSTEM FOR SCANNING PREVIEW OF DIGITAL MEDIA

(75) Inventor: Jorge S. Fino, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/563,140

(22) Filed: Jul. 31, 2012

(65) Prior Publication Data

US 2014/0035831 A1 Feb. 6, 2014

(51) Int. Cl.
*G06F 3/041* (2006.01)
*G06F 3/0488* (2013.01)
*G06F 17/30* (2006.01)

(52) U.S. Cl.
CPC ..... *G06F 3/04883* (2013.01); *G06F 17/30849* (2013.01)

(58) Field of Classification Search
CPC ............ G06F 3/04883; G06F 17/30849; G06F 3/041–3/047; G06F 2203/041–2203/04113
See application file for complete search history.

(56) References Cited

U.S. PATENT DOCUMENTS

| | | | |
|---|---|---|---|
| 2004/0250217 A1* | 12/2004 | Tojo et al. | 715/810 |
| 2008/0086687 A1* | 4/2008 | Sakai et al. | 715/716 |
| 2009/0002335 A1* | 1/2009 | Chaudhri | 345/173 |
| 2009/0153288 A1* | 6/2009 | Hope et al. | 340/3.1 |
| 2011/0242002 A1* | 10/2011 | Kaplan et al. | 345/173 |
| 2013/0151987 A1* | 6/2013 | Flynn et al. | 715/753 |

FOREIGN PATENT DOCUMENTS

WO WO-2014022504 A3 2/2014

OTHER PUBLICATIONS

"Anonymous: Seeburg Select-O-Matic Jukebox Front Panel", [online]. [retrieved on May 2, 2014]. Retrieved from the Internet: <URL: http://www.vintagevending.com/wp-content/uploads/2008/08/seeburgc_jukebox_2.jpg>, (Jan. 1, 1952), 1 pg.
"International Application Serial No. PCT/US2013/052914, International Search Report mailed May 20, 2014", 3 pgs.
"International Application Serial No. PCT/US2013/052914, Written Opinion mailed May 20, 2014", 6 pgs.
"Scrolling to any point in a song in iPod", [online]. [retrieved on Apr. 4, 2014]. Retrieved from the Internet: <URL: https://web.archive.org/web/20111201193606/http://support.apple.com/kb/TA26538>, (Dec. 1, 2011), 1 pg.

* cited by examiner

*Primary Examiner* — Matthew Sim
(74) *Attorney, Agent, or Firm* — Fernando & Partners, LLP

(57) ABSTRACT

A device configured for a scanning preview of digital media includes: a database, a touch-sensitive display, and a processor. The database is configured to store a plurality of media files and a plurality of images, each image of the plurality of images corresponding to a media file of the plurality of media files. The touch-sensitive display is configured to display an indicator and a two-dimensional grid, the two-dimensional grid including the plurality of images the indicator indicating a first image of the two-dimensional grid. The processor is configured to: play a first media file corresponding to the first image; detect a first gesture on the touch-sensitive display; move the two-dimensional grid displayed on the touch-sensitive display in response to detecting the first gesture such that the indicator indicates a second image of the two-dimensional grid; and play a second media file corresponding to the second image.

36 Claims, 11 Drawing Sheets

METHOD AND SYSTEM FOR SCANNING PREVIEW OF DIGITAL MEDIA

FIELD

The present disclosure relates to providing a preview of digital media, specifically a scanning preview of digital media, such as songs or videos, on a touch display using gestures.

BACKGROUND

Modern electronic devices, such as mobile communication devices (e.g., cellular phones, smart phones, tablet computers, etc.) are capable of storing a large amount of media. For example, users commonly maintain large collections of music, movies, or television shows on their electronic devices. Because media collections may be expansive, locating a particular song from a music collection, video from a movie collection, or other specific media may be difficult. In particular, a user often has to devote his or her attention to navigating through sequences of menus and options in order to select a desired media item. This can be frustrating to a user, particularly at times when the user cannot devote all of his or her attention to making a selection, such as when the user is operating a motor vehicle, exercising, etc.

This frustration can be even more prevalent in devices that utilize a touch display. Locating a particular media selection without the assistance from buttons of different shape, size, or location, such as on a traditional car stereo or other type of mobile device, may be frustrating or even dangerous. There is a need for a touch-sensitive device that allows a user to rapidly scan his or her media collection that responds to gestures, but does not require his or her full attention.

SUMMARY

The present disclosure provides a description of a systems and methods for scanning and providing previews of digital media on a device including a touch display.

A device configured for a scanning preview of digital media includes: a database, a touch-sensitive display, and a processor. The database is configured to store a plurality of media files and a plurality of images, each image of the plurality of images corresponding to a media file of the plurality of media files. The touch-sensitive display is configured to display an indicator and a two-dimensional grid, the two-dimensional grid including the plurality of images, the indicator indicating a first image of the two-dimensional grid. The processor is configured to: play a first media file corresponding to the first image; detect a first gesture on the touch-sensitive display; move the two-dimensional grid displayed on the touch-sensitive display in response to detecting the first gesture such that the indicator indicates a second image of the two-dimensional grid; and play a second media file corresponding to the second image.

A method for a scanning preview of digital media includes: storing, in a database, a plurality of media files and a plurality of images, each image of the plurality of images corresponding to a media file of the plurality of media files; displaying, on a touch-sensitive display, an indicator and a two-dimensional grid, the two-dimensional grid including the plurality of images and the indicator indicating a first image of the two-dimensional grid; playing a first media file corresponding to the first image; detecting a first gesture on the touch-sensitive display; moving the two-dimensional grid displayed on the touch-sensitive display in response to detecting the first gesture such that the indicator indicates a second image of the two-dimensional grid; and playing a second media file corresponding to the second image.

BRIEF DESCRIPTION OF THE DRAWING FIGURES

Exemplary embodiments are best understood from the following detailed description when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Systems and methods for providing a scanning preview of digital media are discussed herein.

Figure 1:
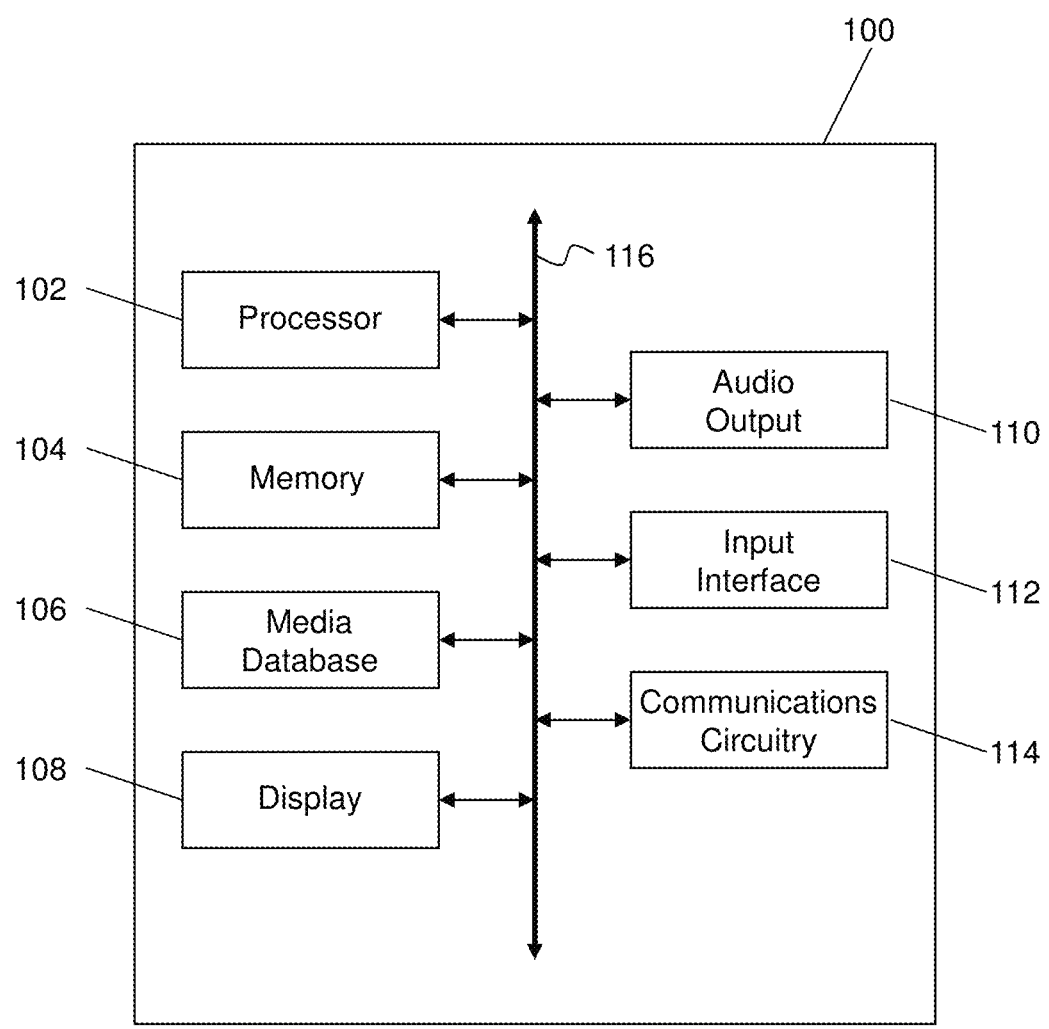
FIG. 1 is a block diagram illustrating a schematic view of an electronic device configured to provide a scanning preview of digital media in accordance with exemplary embodiments.

FIG. 1 is a schematic view of an illustrative electronic device 100. The electronic device 100 may include a processor 102, memory 104, a media database 106, a display 108, an audio output 110, an input interface 112, and communications circuitry 114. It will be apparent to persons having skill at the relevant art that the electronic device 100 may include other components not illustrated in FIG. 1, such as a power supply for providing power to the components of the electronic device 100. Also, while only one of each component is illustrated, the electronic device 100 may include more than one of some or all of the components, such as the processor 102 or the input interface 112. Each of the components of the electronic device 100 may be connected via a bus 116. Suitable types and configurations of the bus 116 will be apparent to persons having skill in the relevant art.

The processor 102 may control the operations and various functions of the electronic device 100. For example, the processor 102 may identify (e.g., in the media database 106) media to play and can direct the display 108 and/or the audio output 110 to display and/or play the identified media. As described in detail below, the processor 102 may control the components of the electronic device 100 to provide a scanning preview of the digital media in accordance with the principles of the invention. The processor 102 may include any components, circuitry, or logic operative to drive the functionality of the electronic device 100. The processor 102 may be any type of processing device suitable for performing the functions as disclosed herein, and may be a single processor or multiple processors interfaced together. In an exemplary embodiment, the processor 102 may act under the control of an application program ("application").

In some embodiments, the application may be stored in the memory 104. The memory 104 may include cache memory, flash memory, read-only memory (ROM), random access memory (RAM), or any other suitable type of memory. In some embodiments, the memory 104 may be dedicated specifically to storing firmware for the processor 102. For example, the memory 104 may store firmware for device applications (e.g., an operating system, scanning preview functionality, user interface functions, and other processor functions).

The media database 106 may be configured to store a plurality of media files, such as songs, videos, images, etc. Data stored in the media database 106 may be stored on any type of suitable storage medium, such as a hard drive, flash drive, or other EPROM or EEPROM. The media database 106 may be configured in any type of suitable database configuration, such as a relational database, a structured query language (SQL) database, a distributed database, an object database, etc. Suitable configurations and database storage types will be apparent to persons having skill in the relevant art. The media database 106 may be a single database, or may comprise multiple databases which may be interfaced together. In some embodiments, the media database 106 may be external to the electronic device 100 and accessed via a network (e.g., via the communications circuitry 114), such as using cloud computing methods.

The media files stored in the media database 106 may include information or metadata associated with the media, such as user-generated or automatically-generated playlists, seed-generated clusters and other groupings (e.g., genre, artist, actor, director, album, etc.), or any other suitable information such a preference information (e.g., ratings, etc.). In some embodiments, the media files may include (e.g., be encoded with) an image which may correspond to the media file (e.g., an album cover for a music file, a poster or cover image for a movie, etc.). In one embodiment, additional information corresponding to a media file may be obtained from a server external to the electronic device 100 (e.g., via the communications circuitry 114).

The display 108, audio output 110, and input interface 112 may provide a user interface for a user to interact with the electronic device 100. The display 108 may be configured to display visual media (e.g., graphics such as album covers, posters, text, video, etc.). The display 108 may also be configured to display a two-dimensional grid of images corresponding to the media files stored in the media database 106. The display 108 may be further configured to display an indicator in addition to the two-dimensional grid, where the indicator indicates an image of the two-dimensional grid. The display 108 may be any type of display suitable for performing the functions as disclosed herein, such as a liquid crystal display (LCD), light-emitting diode (LED) display, or a touch display. In an exemplary embodiment, the display 108 may be a capacitive touch display.

The input interface 112 may be configured to enable a user to provide inputs and feedback to the electronic device 100. Types of inputs suitable for use as the input interface 112 will be apparent to persons having skill in the relevant art and may include a button, keypad, dial, click wheel, accelerometer, or touch screen, such as tactile response touch screen. In an exemplary embodiment, the input interface 112 may be a capacitive touch display. The audio output 110 may be configured to provide an interface by which the electronic device 100 may provide music and other audio elements to a user. The audio output 110 may be any type of speaker suitable for performing the functions disclosed herein. The audio output 110 may output audio to an external speaker (e.g., headphones, computer speakers, etc.) via physical means (e.g., a headphone jack) or wirelessly (e.g., via Bluetooth).

The communications circuitry 114 may be configured to enable the electronic device 100 to communicate with other devices, such as to a server (e.g., including the media database 106, including additional data corresponding to media files, etc.). The communications circuitry may be configured to connect to any network suitable for performing the functions as disclosed herein, which may include a local area network (LAN), a wide area network (WAN), a wireless network (e.g., WiFi), a mobile communication network, a satellite network, the Internet, fiber optic, coaxial cable, infrared, radio frequency (RF), Bluetooth, etc., or any combination thereof. Suitable configurations of the communications circuitry 114 will be apparent to persons having skill in the relevant art.

The electronic device 100 may be configured to provide a scanning preview of digital media to a user. For simplicity, the embodiments of the invention will be described in terms of providing a scan preview of songs. However, this is not intended to be limiting but merely provided as example, and it will be apparent to persons having skill in the relevant art that the scanning preview as disclosed herein may be used with other types of digital media, such as movies, videos, audio interviews, podcasts, or any other suitable browsable item. In some embodiments, the scan preview may provide an audible reading of a text-based document to, for example, provide accessibility options to a visually challenged user who may otherwise be unable to easily read the document.

As used herein, the term "preview" may refer to playing a portion (e.g., a "snippet") of a media file, such as a portion of a song or movie. It will be apparent to persons having skill in the relevant art that the portion of the media file previewed may be any portion (e.g., the beginning, middle, or end) of the media file and may be based on the type of media file, user preferences, or other information (e.g., not previewing a portion of a song that is silent).

A scan preview provided in accordance with the principles of the invention may involve playing portions, or snippets, of songs or other media files in succession to provide a user with a preview of each corresponding song. The songs selected for the scan preview may be all songs stored in the media database 106 or may be identified (e.g., selected) from a variety of categories, such as artist, album, genre, release date, download date, user rating, playlist, etc., or a combination thereof.

The electronic device 100 may be configured such that a user may be enabled to control the progression of the scan preview. In an exemplary embodiment, the user may control the scan preview by using gestures on a touch screen display. Methods for the detection and measuring of gestures on a touch screen display, including the velocity, direction, and length (e.g., of a hold gesture) will be apparent to persons having skill in the relevant art. Types of gestures that may be suitable for use in controlling the scan preview of digital media in the electronic device 100 may include a swipe gesture, a tap gesture, a swipe and hold (e.g., a swipe where the contact remains with the touch display at the end of the swipe for a length of time greater than a tap), a press gesture, or the release of a hold gesture.

FIGS. 2-8 illustrate display screens that may be displayed by the display 108 of the electronic device 100 in accordance with exemplary embodiments of the scanning preview as disclosed herein. Accordingly, each of FIGS. 2-8 will be described with reference to the electronic device 100 and its components as illustrated in FIG. 1.

Figure 2:
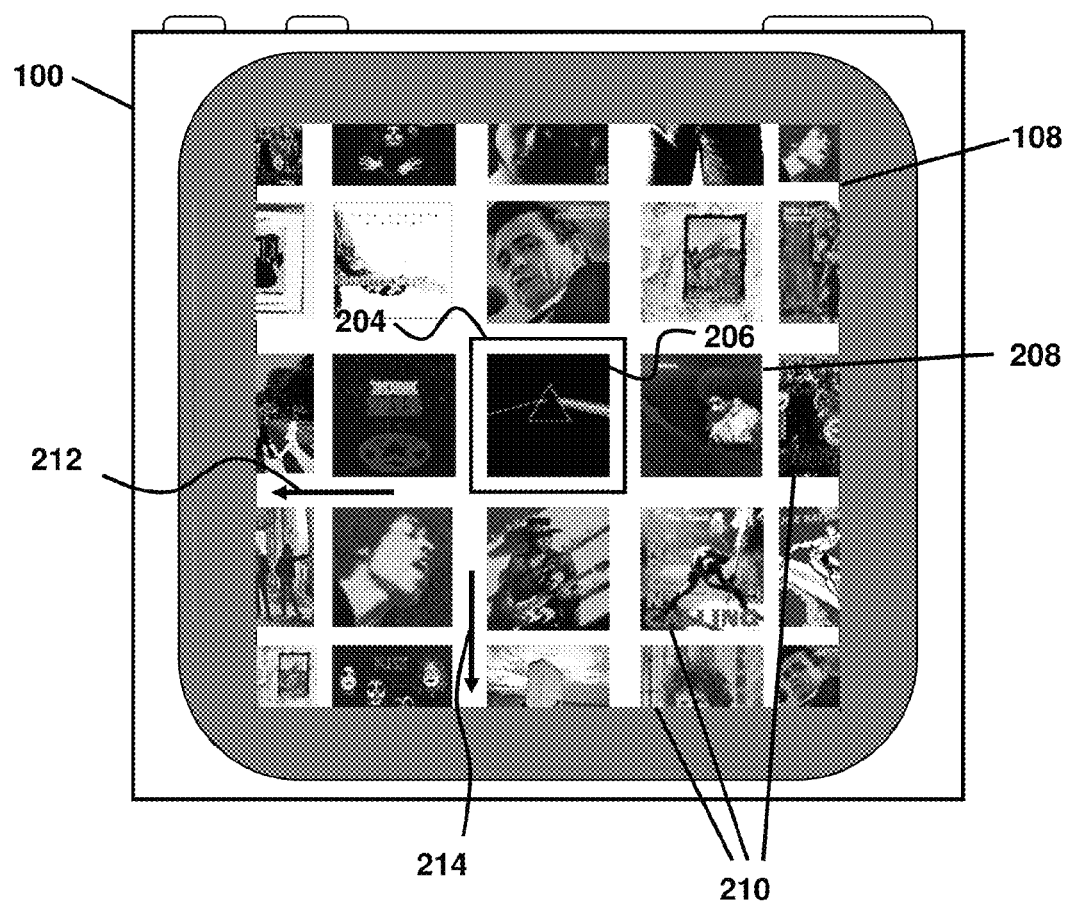
FIG. 2 is an illustrative device including a touch-sensitive display configured for a scanning preview of digital media in accordance with exemplary embodiments.

FIG. 2 illustrates the display 108 that may be displayed by the electronic device 100 for a scan preview of media files stored in the media database 106. The display 108 may display a plurality of images 210 corresponding to media files, such as album covers for songs, in a two-dimensional grid. The display 108 may also include an indicator 204 in the two-dimensional grid, which may indicate a song for which a preview may be played. As illustrated in FIG. 2, a first image 206 may be included within the indicator 204. The electronic device 100 may (e.g., via the processor 102 and the audio output 110) play a preview of the media file corresponding to the first image 206. In one embodiment, the preview may be of a predetermined period of the corresponding media file. In another embodiment, the preview may be of a random period. In yet another embodiment, the preview may be of a period as selected by a user of the electronic device 100.

As illustrated in FIG. 2, a user of the electronic device 100 may make a swipe gesture on the touch screen display 108 in order to move the two-dimensional grid. For example, the user may make a horizontal (e.g., right to left or left to right) swipe such as the swipe 212 or a vertical (e.g., up to down or down to up) swipe such as the swipe 214, which may be identified (e.g., by the input interface 112) and then cause (e.g., via the processor 102) the two-dimensional grid of images to move in the corresponding direction.

It will be apparent to persons having skill in the relevant art that the plurality of images 210 displayed in the two-dimensional grid displayed may include all media files stored in the media database 106, or a subset thereof. For example, the two-dimensional grid may display only those media files of a specific type (e.g., songs, movies, etc.), a specific genre (e.g., classic rock), specific artist (e.g., Jimi Hendrix), etc., or a combination thereof. In one embodiment, the user may indicate the category of media files to display in the two-dimensional grid. In another embodiment, the media files displayed in the two-dimensional grid may be based on gestures performed by the user during the scanning preview (e.g., a gesture may indicate a preference for or against a particular artist, genre, etc.).

In one embodiment, if no gesture is made during the scanning preview for a predetermined period of time (e.g., 5 seconds, 10 seconds, etc.), then the media file corresponding to the image indicated by the indicator 204 may be played (e.g., from the beginning) by the electronic device 100. In another embodiment, the scan preview mode may continue to be displayed until an indication (e.g., gesture) is made by the user. In some embodiments, the display 108 may switch to a screen corresponding to a media file being played after a predetermined period of time, such as the screen illustrated in FIG. 3.

Figure 3:
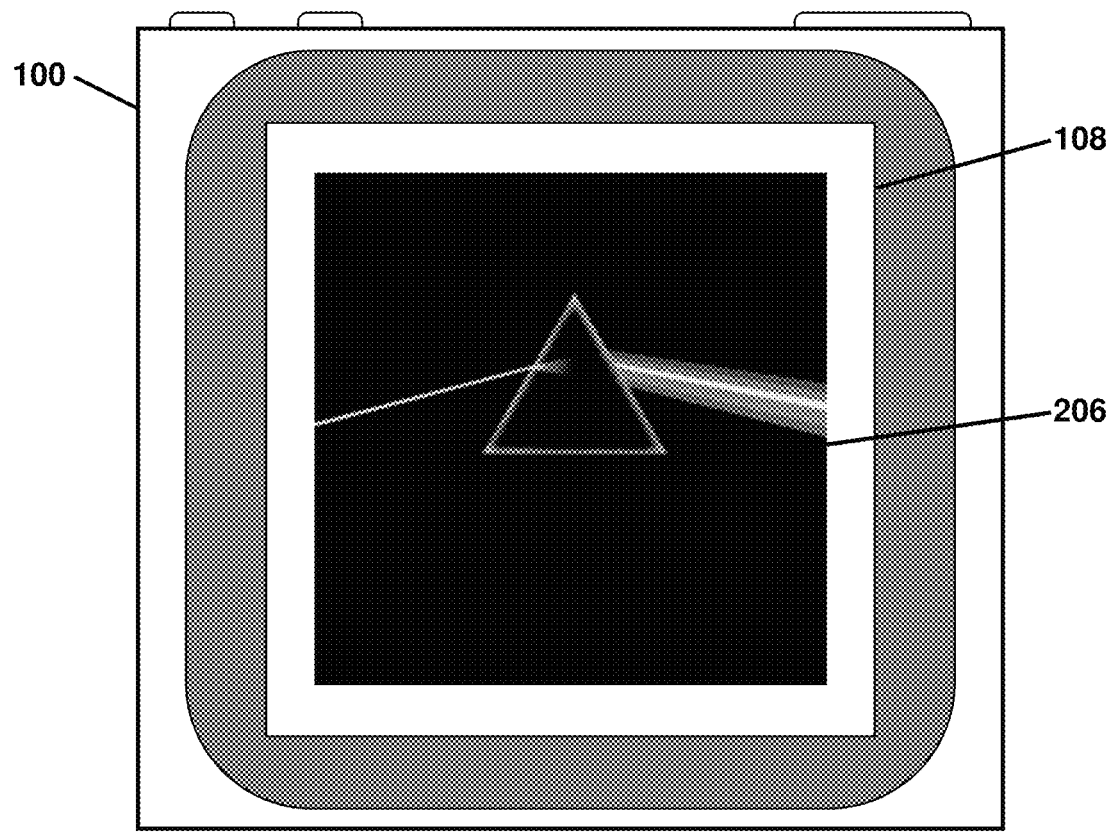
FIG. 3 is an illustrative display screen that may be provided while an electronic device is playing selected media in accordance with exemplary embodiments.

In FIG. 3, the display 108 may display the first image 206, as was included in the indicator 204 during the scan preview mode. In some embodiments, the display 108 may also display additional information associated with the media file corresponding to the first image 206. For example, the display 108 may include, if the media file is a song, the title of the song, the artist, the genre, the album the song is from, the track number of the song, etc. In some instances, the display 108 may include an indication of the progress of the song (e.g., a bar, number, or other display of the time elapsed and/or time remaining in the song). In some embodiments, the display 108 may include buttons or other interactive elements with which a user of the electronic device 100 may interact, such as preference buttons (e.g., shuffle, repeat, volume, etc.), playlist buttons (e.g., add to a playlist, create playlist based on current song, etc.), additional track buttons (e.g., songs similar to current song, others songs by same artist, other songs on same album, etc.), etc.

Figure 4:
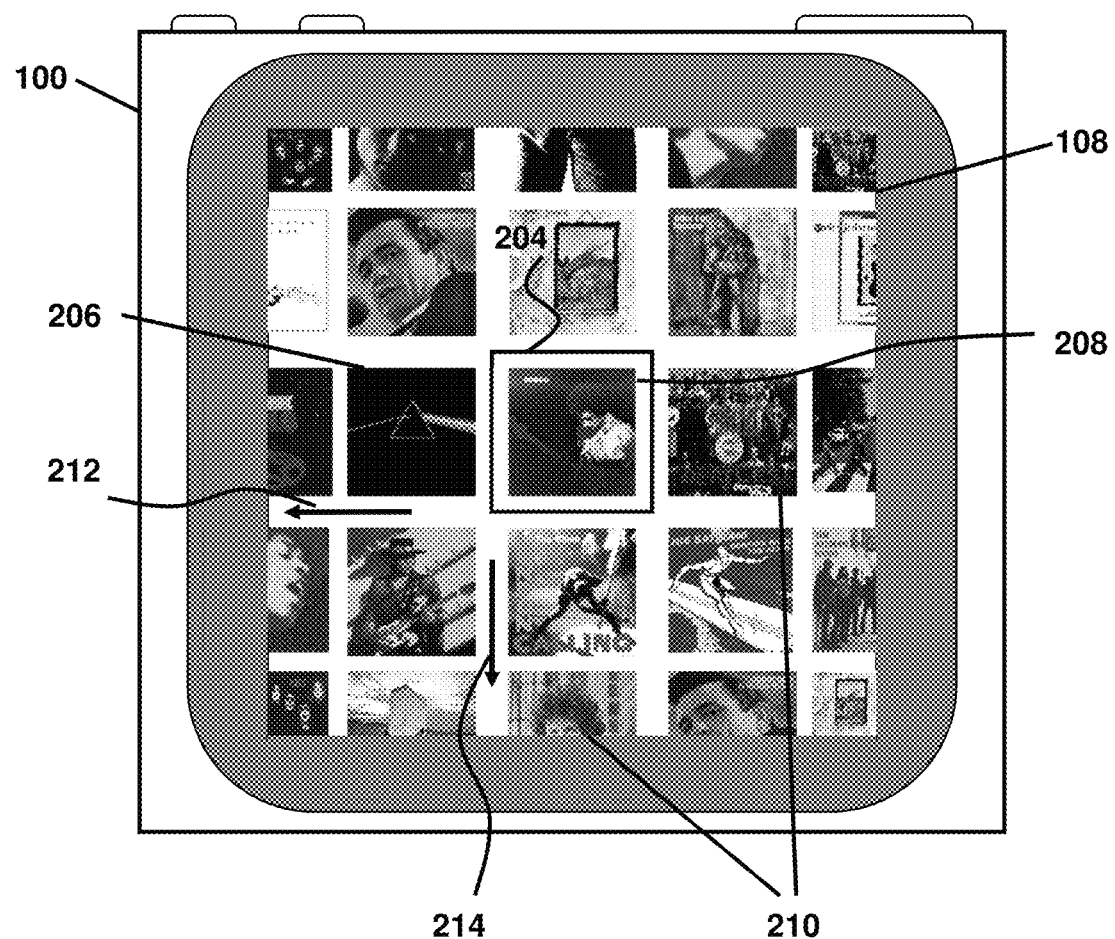
FIG. 4 is an illustrative display screen that may be provided in response to a user gesture on a two-dimensional grid in accordance with exemplary embodiments.

As discussed above, with reference to FIG. 2, the user may perform a gesture (e.g., a swipe gesture) to move the two-dimensional grid on the display 108 to perform a scanning preview of media files corresponding to the images in the two-dimensional grid. If the user performs the gesture 212, which may include a swipe from right to left, the two-dimensional grid may move accordingly, as illustrated in FIG. 4. In FIG. 4, the second image 208 has moved to be inside the indicator 204, with the first image 206 being to the left of and no longer indicated by the indicator 204. When the second image 208 moves inside the indicator 204 as a result of the gesture 212, the electronic device 100 may (e.g., via the audio output 110) play a preview of the media file corresponding to the second image 206. In one embodiment, the electronic device 100 may play the preview of the media file when the second image 206 enters the indicator. In another embodiment, the electronic device 100 may play the preview when the first image 204 exits the indicator. In yet another embodiment, the electronic device 100 may play the preview when the entirety of the second image 206 is in the indicator 204.

As illustrated in FIG. 4, when the use performs the gesture 212, the two-dimensional grid may move such that the second image 208 enters the indicator 204. It will be apparent to persons having skill in the relevant art, that the movement of the two-dimensional grid in response to a swipe gesture 212 may be based on the direction, velocity, and/or pressure of the gesture 212. For example, the two-dimensional grid may move faster in response to a faster gesture 212, may move further (e.g., more images passing through the indicator 204) in response to a longer and/or faster gesture 212, etc. In one embodiment, if multiple images pass through the indicator 204, the electronic device 100 may play a preview of each corresponding media file as the image passes through the indicator 204, as to provide a scanning preview of multiple media files.

Figure 5:
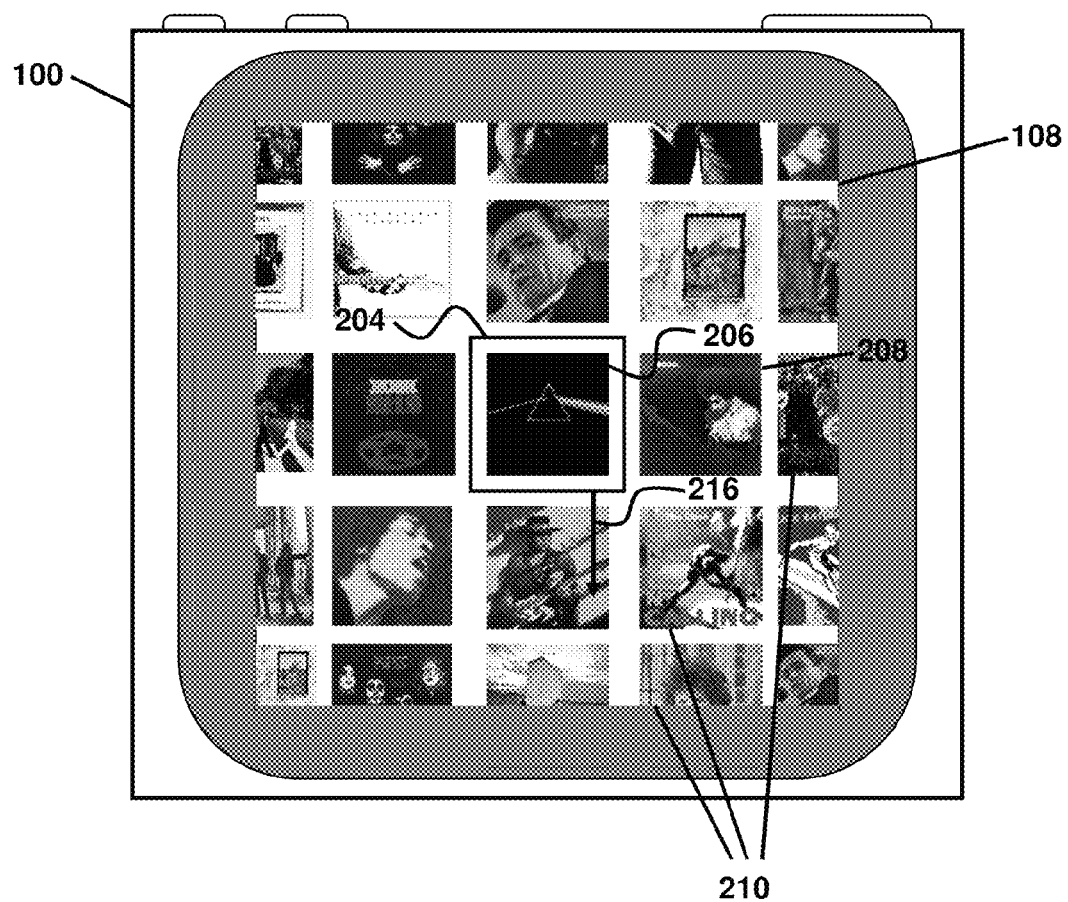
FIG. 5 is an illustrative display screen for providing an indicator that may be moved via a gesture for a scanning preview of digital media in accordance with exemplary embodiments.

In some embodiments, the indicator 204 of the two-dimensional grid displayed by the display 108 of the electronic device 100 may be moved to provide a scanning preview of digital media. As illustrated in FIG. 5, the indicator 204 may indicate the first image 206. The electronic device 100 may play a preview of the media file corresponding to the first image 206. A user of the electronic device 100 may perform a gesture 216, such as a swipe gesture. In some embodiments, the indicator 204 may move in response to the swipe gesture such that the indicator 204 moves in the same direction as the gesture 216 and/or at the same velocity as the gesture 216. In one embodiment, the indicator 204 may move to the location on the display 108 where the gesture 216 ends.

Figure 6:
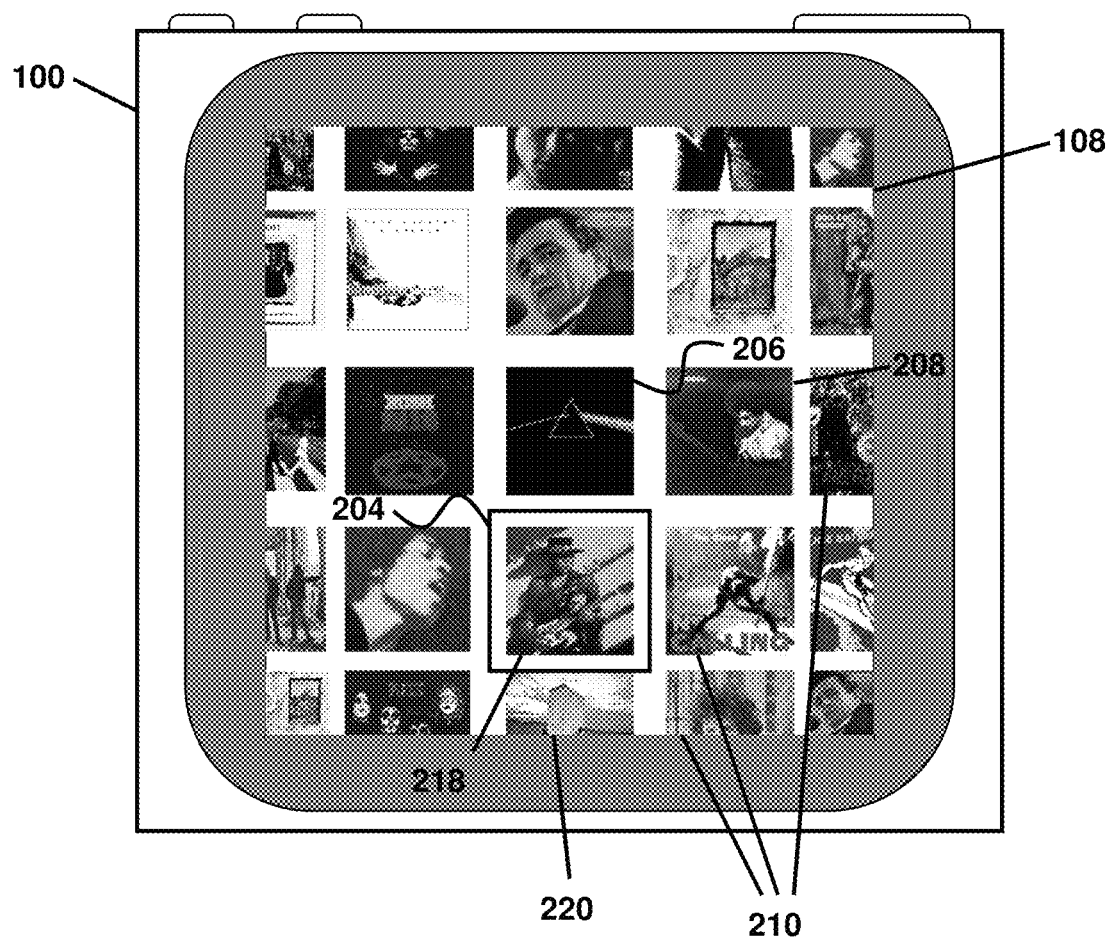
FIG. 6 is an illustrative display screen that may be provided in response to a user gesture on a displayed indicator in accordance with exemplary embodiments.

For example, the user may perform the gesture 216 as illustrated in FIG. 5 (e.g., a swipe in the direction from top to bottom), which may move the indicator 204 from the first image 206, to a third image 218, as illustrated in FIG. 6. The electronic device 100 may play a preview of the media file corresponding to the third image 218. In one embodiment, the electronic device 100 may play the preview of the media file when the third image 218 enters the indicator. In another embodiment, the electronic device 100 may play the preview when the first image 204 exits the indicator. In yet another embodiment, the electronic device 100 may play the preview when the entirety of the third image 218 is in the indicator 204.

The electronic device 100 may be configured such that, when the indicator 204 is moved, as illustrated in FIG. 6, the two-dimensional grid of images displayed by the display 108 may continually move. In some embodiments, the two-dimensional grid may move in the direction of the indicator 204 in relation to the center of the display 108 (e.g., the original location of the indicator 204). In another embodiment, the two-dimensional grid may move in an opposite direction of the indicator 204 in relation to the center of the display 108 (e.g., as illustrated in FIG. 7, discussed in more detail below).

In an exemplary embodiment, the indicator 204 may stop in the corresponding location after the gesture 216 has been performed, and may remain in the corresponding location. In a further embodiment, the two-dimensional grid may continually move (e.g., as illustrated in FIG. 7, discussed below) as long as the indicator 204 is not returned to the original position (e.g., in the center of the display 108). The electronic device 100 may play a preview of every media file corresponding to each image that passes through the indicator 204 as to provide a scanning preview of each digital media file of the two-dimensional grid that passes through the indicator 204. In an exemplary embodiment, the two-dimensional grid may be repeated on the display 108 such that there is no end to the two-dimensional grid when continually moved. For example, if the two-dimensional grid is only five images wide, once the fifth image has entered the display 108, the next image to enter in the same direction would be a repeat of the first image, etc. In such an embodiment, the scanning preview could continue indefinitely as to not interrupt the user experience.

Figure 7:
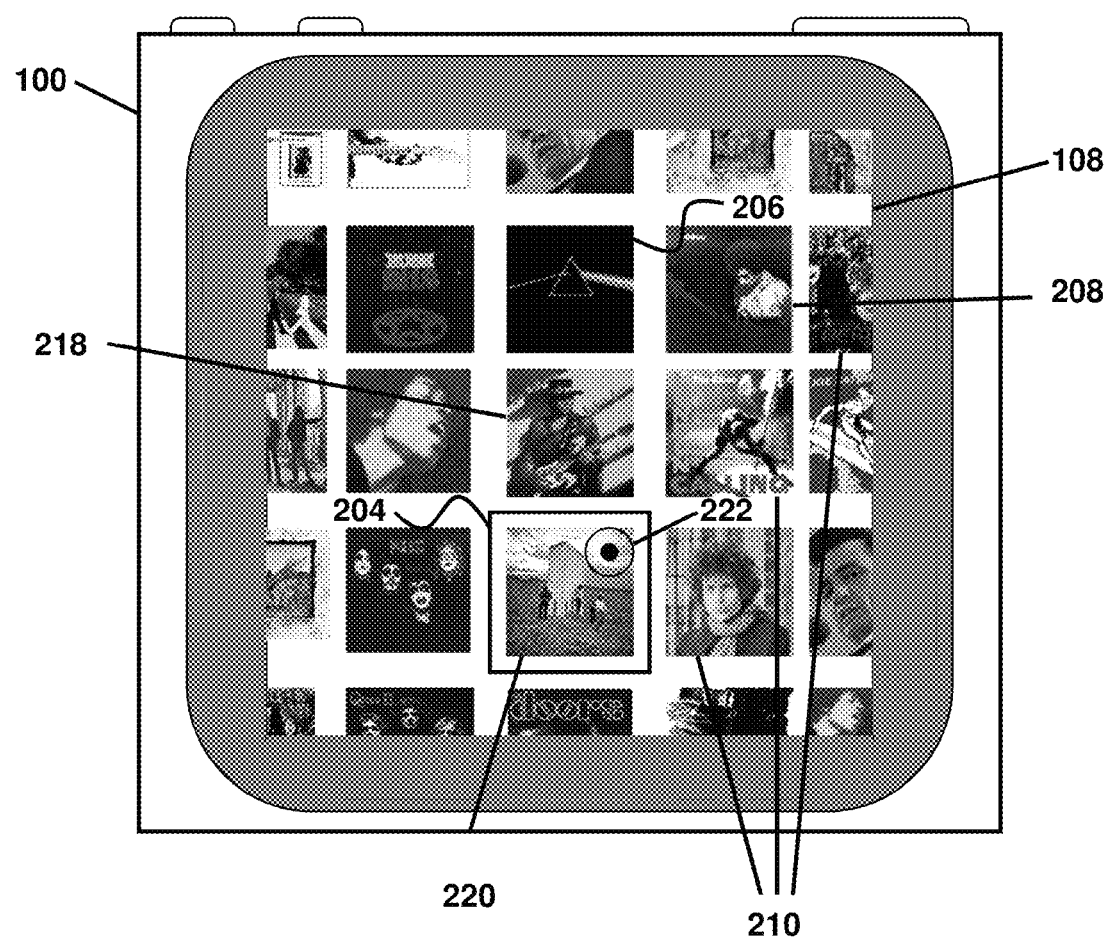
FIG. 7 is an illustrative display screen of a visual interface that may be provided while an electronic device is operating in scan preview mode in accordance with exemplary embodiments.

In FIG. 7, the two-dimensional grid is illustrated as having continually moved in response to the movement of the indicator 204 as indicated in FIGS. 5 and 6. The indicator 204, as having moved from the central position of the display 108 to a position below the central position (e.g., in response to the gesture 216), may result in the two-dimensional grid moving from bottom to top. In FIG. 6, the indicator 204 was illustrated as indicating the third image 218, with the electronic device 100 previewing the corresponding media file. As the indicator 204 remained in the position apart from the central position of the display 108, the two-dimensional grid continued to move as indicated in FIG. 7, such that the third image 218 exited the indicator 204 and the fourth image 220 entered the indicator 204. The electronic device 100 may play a preview of the media file corresponding to the fourth image 220 as discussed herein.

In some embodiments, the two-dimensional grid may continually move while the indicator 204 is not in the central position of the display 108. The two-dimensional grid may stop if the indicator 204 is moved to the center of the display 108, such as by a gesture opposite to the gesture 216. The electronic device 100 may provide a scanning preview of all media files corresponding to each image to pass through the indicator 204. If a media file is previewed that a user desires to listen to (e.g., or view), then the user may perform a gesture 222, such as a tap gesture on the corresponding image file. As illustrated in FIG. 7, the electronic device 100 may preview the media file corresponding to the fourth image 220 as indicated by the indicator 204. The user may perform the gesture 222, which may select the media file corresponding to the fourth image 220.

Figure 8:
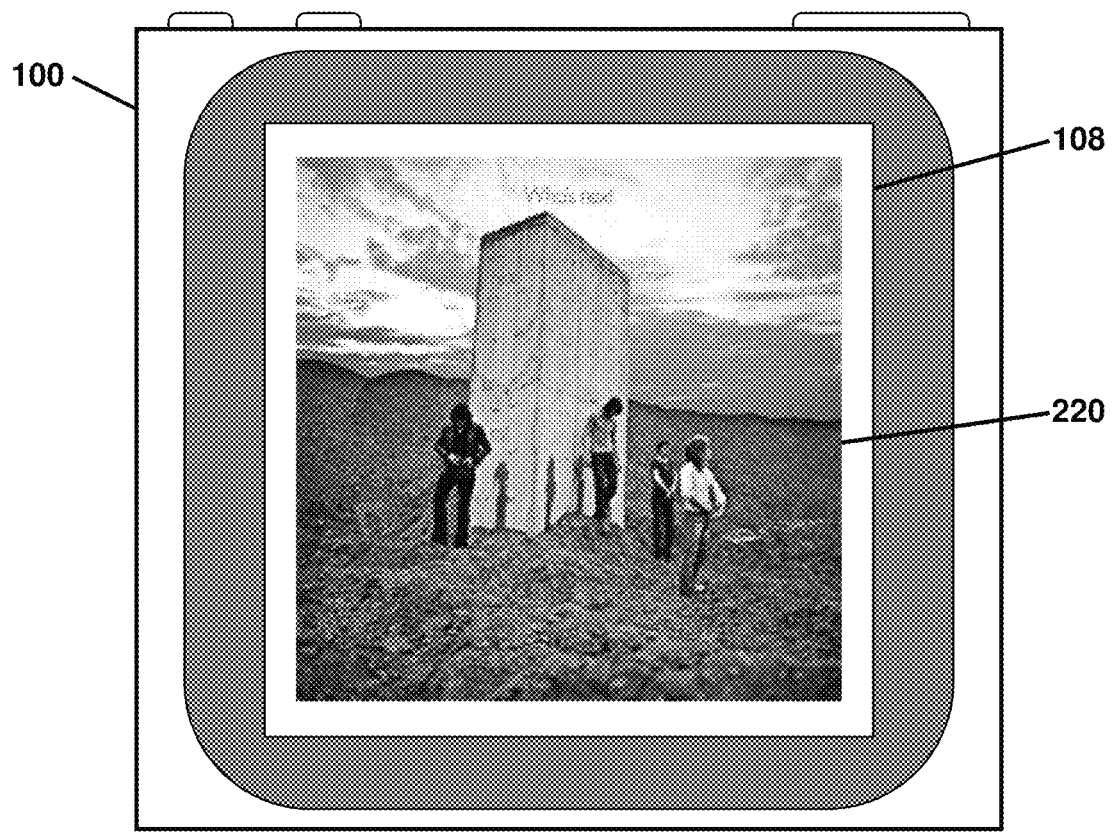
FIG. 8 is an illustrative display screen of a visual interface that may be provided following a user gesture during scan preview mode in accordance with exemplary embodiments.

As illustrated in FIG. 8, the electronic device 100 may play the media file corresponding to the fourth image 220, which may include displaying the fourth image 220 on the display 108. In some embodiments, the display 108 may also display additional information associated with the media file corresponding to the fourth image 220. For example, the display 108 may include, if the media file is a song, the title of the song, the artist, the genre, the album the song is from, the track number of the song, etc. In some instances, the display 108 may include an indication of the progress of the song (e.g., a bar, number, or other display of the time elapsed and/or time remaining in the song). The display 108 may also include additional information or elements as discussed herein.

Figure 9:
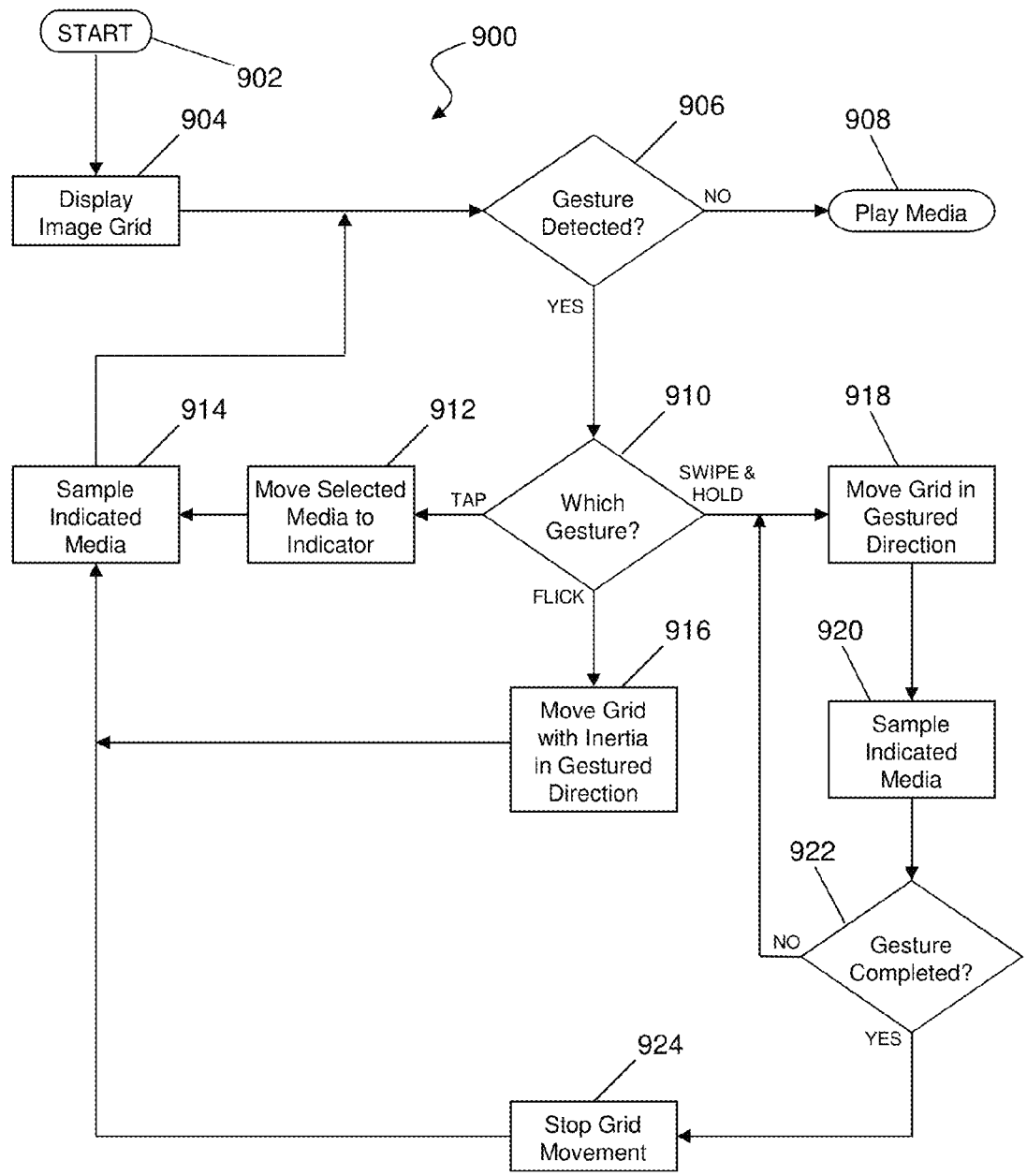
FIGS. 9 and 10 are flowcharts illustrating methods for providing a scan preview of media using the electronic device of FIG. 1 in accordance with exemplary embodiments.
Figure 10:
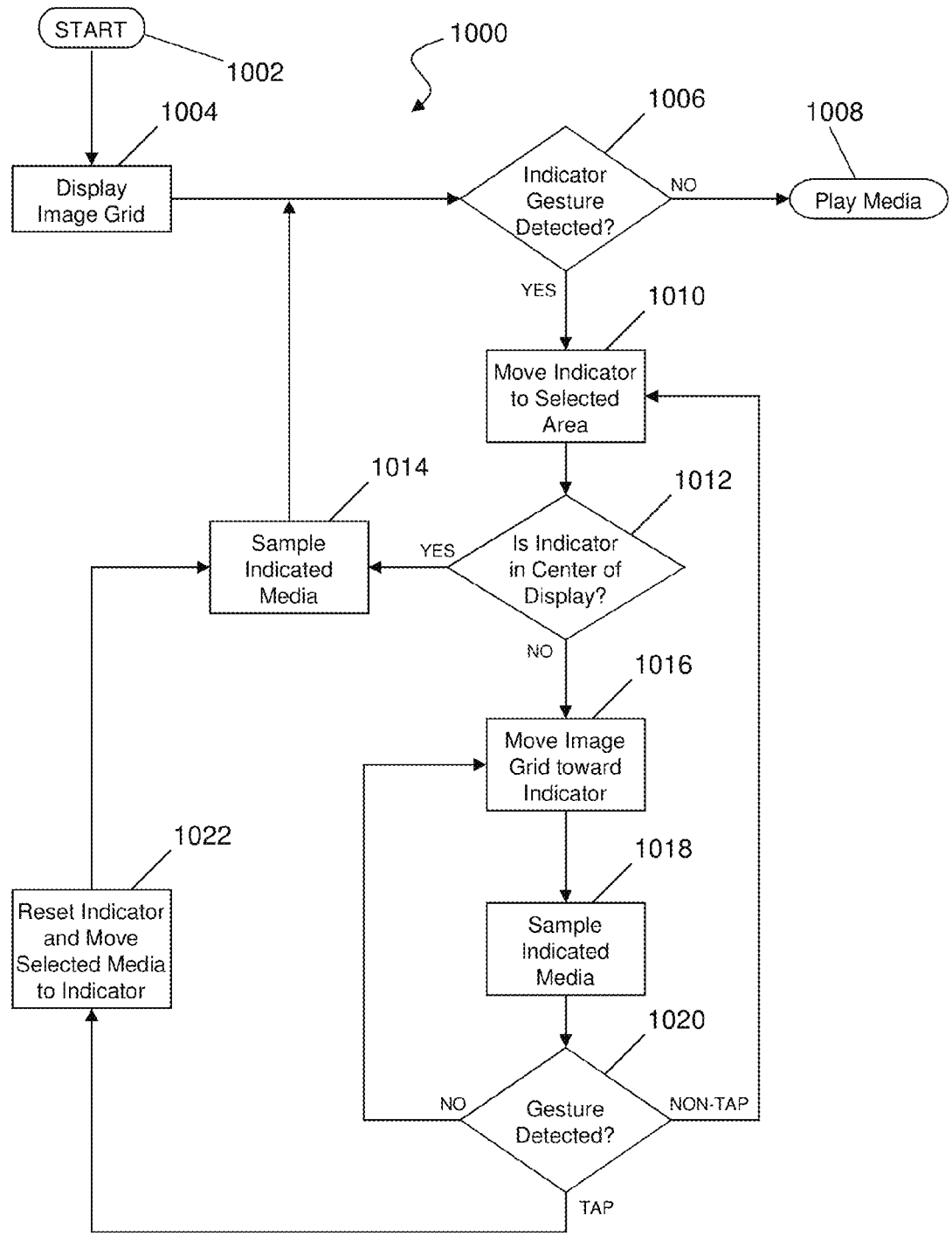

FIGS. 9 and 10 are illustrative processes that may be executed by the electronic device 100 configured in accordance with the invention. It should be understood that the processes are merely illustrative. Any steps in these flowcharts may be modified, removed, or combined, and any steps may be added, without departing from the scope of the invention.

FIG. 9 is a flowchart of illustrative process 900 providing for a scanning preview of digital media in accordance with an embodiment of the invention. Process 900, in particular, illustrates one way in which different types of scan previews can be initiated by the electronic device 100, specifically by gestures on the two-dimensional grid while the indicator 204 remains in the center of the display 108.

The process 900 starts at step 902 and moves to step 904. At step 904, the electronic device 100 may display (e.g., via the display 108) an image grid. The image grid may be a two-dimensional grid of a plurality of image files stored (e.g., encoded in media files) in the media database 106, such as the two-dimensional grid illustrated in FIG. 2. At step 906, the electronic device 100 may (e.g., using the input interface 112 and processor 102) determine if a gesture has been detected. If no gesture has been detected, then, in step 908, the electronic device 100 may play media corresponding to the currently indicated image displayed on the display 108. In one embodiment, the media may only be played after a predetermined amount of time during which no gesture has been detected.

If a gesture is detected by the electronic device 100 in step 906, then, in step 910, the processor 102 may determine what type of gesture has been detected. It will be apparent to persons having skill in the relevant art that the actions performed in the process 900 based on the gestures determined in step 910 are illustrative only, and that any combination of gestures and subsequently performed actions may be used. If the gesture is determined to be a tap, then, in step 912, the image grid may be moved such that the selected media (e.g., as indicated by the tap gesture) is moved to the indicator 204. In step 914, the electronic device 100 may play a sample (e.g., a portion, preview, etc.) of the media file corresponding to the image file indicated by the indicator 204. Once the sample is played, the process 900 may return to step 906 to detect additional gestures.

If, in step 910, the gesture is determined to be a flick gesture (e.g., such as a swipe gesture without a hold at the beginning or end of the gesture), then, in step 916, the electronic device 100 may move the image grid with inertia (e.g., corresponding to the velocity of the flick) in the gestured direction. Once the image grid is moved, then the process 900 may go to step 914, where a sample of the corresponding media file may be played and additional gestures detected. In some embodiments, if the image grid is moved such that multiple image files pass through the indicator 204, then the electronic device 100 may sample the media file corresponding to each image that passes through the indicator 204.

If, in step 910, the gesture is determined to be a swipe and hold gesture, then, in step 918, the image grid may be moved in the gestured direction. In some embodiments, the velocity of the movement of the image grid may be based on the distance of the gesture (e.g., in overall distance, distance from the center of the display 108, distance from the gesture starting point, etc.). In step 920, the electronic device 100 may sample the media file corresponding to the image indicated by the indicator 204. In step 922, the electronic device 100 may determine if the swipe and hold gesture is completed. If the gesture is not completed, then the process 900 may return to step 918 and continue to move the image grid and sample indicated media. In some embodiments, the movement of the image grid may be modified by additional swiping, such as to change directions or velocity of the image grid while sampling media. For example, the user may change the velocity of the image grid by swiping closer or further away from the center of the display 108, or may reverse the direction of the image grid by swiping across the center of the display 108.

If, in step 922, the electronic device 100 determines that the gesture has been completed (e.g., that both the swipe and hold are finished), then the process 900 may move to step 924. In step 924, the movement of the image grid may be stopped. The process 900 may then move to step 914, where the media corresponding to the image indicated by the indicator 204 on the display 108 may be sampled by the electronic device, and then additional gestures detected. The process 900 may continue to enable a user to continually scan and preview digital media until no gestures are performed and the corresponding media played (e.g., as illustrated in FIGS. 2 and 3).

FIG. 10 is a flowchart of illustrative process 1000 providing for a scanning preview of digital media in accordance with an embodiment of the invention. Process 1000, in particular, illustrates one way in which different types of scan previews can be initiated by the electronic device 100, specifically by gestures on the indicator 204 of the display 108.

The process 1000 may begin at step 1002 and proceed to step 1004. In step 1004, the electronic device 100 may display (e.g., via the display 108) an image grid. The image grid may be a two-dimensional grid of a plurality of image files stored in (e.g., via encoding in media files) the media database 106. In step 1006, the electronic device 100 may determine if any gestures have been detected on the indicator 204. In no gestures have been indicated, then, in step 1008, the electronic device 100 may play the media file corresponding to the image indicated by the indicator 104.

If, in step 1006, a gesture on the indicator 204 has been detected, then, in step 1010, the electronic device 100 may move the indicator 204 to the selected area based on the gesture. For example, if the gesture is a tap, the indicator 204 may be moved to the location of the tap on the display 108. If the gesture is a swipe or a flick, the indicator 204 may be moved to the location at the end of the swipe or flick, or may be moved based on the direction and/or velocity of the swipe or flick. In step 1012, the electronic device 100 may determine if the indicator is in the center of the display 108. If the indicator 204 is determined to be in the center of the display 108, then the electronic device 100 may, in step 1014, play a sample (e.g., a preview) of the media file corresponding to the image indicated by the indicator 204. From there, the process 1000 may return to step 1006 to identify further gestures to the indicator 204.

If the indicator 204 is not in the center of the display 108 after being moved, then, in step 1016, the image grid may be moved toward the indicator 204. In one embodiment, the direction and/or velocity of the movement of the image grid may be based on the location of the indicator 204. For example, the image grid may move faster the further the indicator 204 is from the center of the display 108, and the direction of movement may be based on the location of the indicator 204 relative to the center of the display 108. In step 1018, the electronic device 100 may sample the media file corresponding to the image indicated by the indicator 204 following the movement performed in step 1018.

In step 1020, the electronic device 100 may determine if another gesture is detected. If no gesture is detected, then the process 1000 may return to step 1016, where the image grid may continue to move towards the indicator 204. In such an instance, the image grid may move continually and continue to sample media files to provide a scanning preview without intervention from the user. If a gesture is detected and the gesture is determined to not be a tap gesture, then the process 1000 may return to step 1010 and move the indicator 204 to an area based on the newly detected gesture. In such an instance, the user may be able to change the velocity or direction of the image grid to further customize the scanning preview experience. It one embodiment, the image grid may repeat itself such that the image grid does not end during continual movement, as discussed previously.

If, in step 1020, the electronic device 100 determines that a tap gesture has been detected, then, in step 1022, the indicator 204 may be reset (e.g., returned to the center of the display 108) and the image indicated by the user (e.g., based on the tap gesture on the display 108) may be moved to the indicator 204. Then the process 1000 may return to step 1014, where the media file corresponding to the selected image may be sampled and then further gestures detected.

FIGS. 9 and 10 provide for a scanning preview of digital media in an electronic device 100 by moving a two-dimensional grid or indicator 204 using gestures on the display 108. Such processes allow for a user to selectively or continually preview digital media without requiring his or her full attention. The user may, for example, preview through a catalog of songs and, when a suitable one is found, allow the electronic device 100 to play the full track with or without an indication. It some embodiments, the electronic device 100 may be further configured to allow for additional customization and user interactivity with the scanning preview.

For example, the image grid may display only images corresponding to media files as indicated by the user, such as songs of a particular genre or artist. As another example, the image grid may continually change based on songs previewed and/or songs listened to by the user, such as populating the image grid with classic rock songs more frequently if the user stops scans to listen to classic rock songs more than any other genre. As an additional example, the user may listen to a song on the electronic device 100 and then initiate a scanning preview of additional media files based on the song or some criteria (e.g., as encoded in the media file in the media database 106) corresponding to the song, such as a preview of other songs by the same artist, on the same album, in the same genre, by similar artists, etc. Additional methods for providing additional customization and user interactivity will be apparent to persons having skill in the relevant art.

Figure 11:
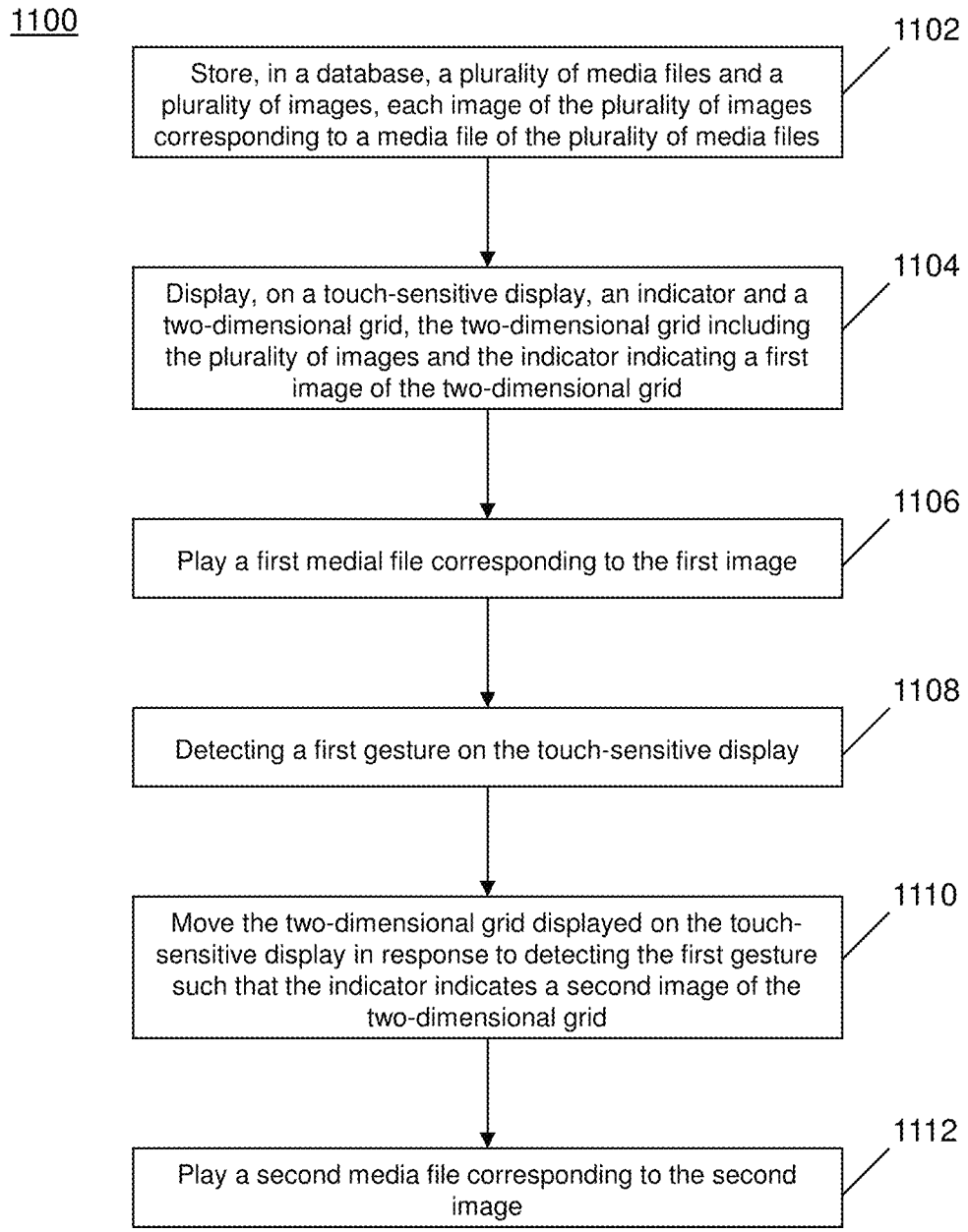
FIG. 11 is a flowchart illustrating an exemplary method of previewing digital media in accordance with exemplary embodiments.

FIG. 11 illustrates an exemplary method 1100 for a scanning preview of digital media. In step 1102, a plurality of media files and a plurality of images (e.g., the first image 206, the second image 208, etc.) may be stored in a database (e.g., the media database), where each image of the plurality of images corresponds to a media file of the plurality of media files. In one embodiment, the image corresponding to the media file may be encoded in the media file. In some embodiments, the media files may be audio files.

In step 1104, an indicator (e.g., the indicator 204) and a two-dimensional grid may be displayed on a touch-sensitive display (e.g., the display 108), where the two-dimensional grid includes the plurality of images and the indicator 204 indicates a first image (e.g., the first image 206) of the two-dimensional grid. In one embodiment, the touch-sensitive display may be a capacitive touch display. In step 1106, a first media file corresponding to the first image 206 may be played (e.g., via the audio output 110). Then, in step 1108, a first gesture may be detected (e.g., via the input interface 112 and the processor 102) on the touch-sensitive display. In one embodiment, the first gesture may be a flick gesture. In another embodiment, the first gesture may be a swipe gesture.

In step 1110, the two-dimensional grid displayed on the touch-sensitive display may be moved in response to the detecting of the first gesture such that the indicator 204 indicates a second image (e.g., the second image 208) of the two-dimensional grid. In some embodiments, the two-dimensional grid may be repeated such that the two-dimensional grid has no end when moved on the touch-sensitive display. In step 1112, a second media file corresponding to the second image may be played.

In some embodiments the method 1100 may further include detecting a second gesture on the touch sensitive display, continually moving the two-dimensional grid in response to detecting the second gesture until a third gesture is detected on the touch-sensitive display, and playing a third media file corresponding to a third image indicated by the indicator 204 after detecting the third gesture. In a further embodiment, the second gesture may be a swipe gesture and the third gesture may be a press gesture or a tap gesture. In another further embodiment, the second gesture may be a swipe and hold gesture and the third gesture may be a release of the hold gesture. In an even further embodiment, the speed and direction of the continual movement of the two-dimensional grid may be based on the swipe and hold gesture.

In other embodiments, the method 1100 may further include detecting a second gesture on the touch-sensitive display, continually moving the two-dimensional grid displayed in response to detecting the second gesture until a third gesture is detected such that the indicator indicates a subset of the plurality of images during the continual movement of the two-dimensional grid, playing a portion of each media file corresponding to each image in the subset of the plurality of images when the indicator indicates the corresponding image during the continual movement of the two-dimensional grid, and playing a third media file corresponding to a third image indicated by the indicator 204 after detecting the third gesture. In a further embodiment, the second gesture may be a swipe gesture and the third gesture may be a press gesture or a tap gesture. In another further embodiment, the second gesture may be a swipe and hold gesture and the third gesture may be a release of the hold gesture. In an even further embodiment, the speed and direction of the continual movement of the two-dimensional grid may be based on the swipe and hold gesture.

Techniques consistent with the present disclosure provide, among other features, systems and methods for scanning preview of digital media. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. An electronic device, comprising:
  a touch-sensitive display configured to display a user-interface including an indicator and a two-dimensional grid, the two-dimensional grid including a plurality of images and the indicator indicating a first image of the two-dimensional grid, wherein each image in the plurality of images corresponds to a media file in a plurality of media files; and
  a processor configured to
    generate the user-interface for display on the touch-sensitive display,
    play a first media file corresponding to the first image,
    detect a first gesture on the touch-sensitive display, wherein the first gesture is a swipe gesture including motion directed toward a first edge of the display,
    in response to detecting the first gesture and while maintaining the position of the indicator away from the first edge of the display, simultaneously move the two-dimensional grid displayed on the touch-sensitive display and the indicator such that the indicator indicates a second image of the two-dimensional grid, and
    play a second media file corresponding to the second image.

2. The device of claim 1, wherein the processor is further configured to:
  detect a second gesture on the touch-sensitive display;
  continually move the two-dimensional grid displayed on the touch-sensitive display in response to detecting the second gesture until a third gesture is detected on the touch-sensitive display; and
  play a third media file corresponding to a third image indicated by the indicator after detecting the third gesture.

3. The device of claim 2, wherein the second gesture is a swipe and hold gesture.

4. The device of claim 3, wherein the third gesture is a release of the hold gesture.

5. The device of claim 4, wherein the speed and direction of the continual movement of the two-dimensional grid is based on the swipe and hold gesture.

6. The device of claim 1, wherein the processor is further configured to:
    detect a second gesture on the touch-sensitive display;
    continually move the two-dimensional grid displayed on the touch-sensitive display in response to detecting the second gesture until a third gesture is detected on the touch-sensitive display, such that the indicator indicates two or more images in the plurality of images during the continual movement of the two-dimensional grid;
    play of portion of each media file corresponding to each image in the two or more images in the plurality of images when the indicator indicates the corresponding image during the continual movement of the two-dimensional grid; and
    play a third media file corresponding to a third image indicated by the indicator after detecting the third gesture.

7. The device of claim 6, wherein the second gesture is a swipe and hold gesture.

8. The device of claim 7, wherein the third gesture is a release of the hold gesture.

9. The device of claim 8, wherein the speed and direction of the continual movement of the two-dimensional grid is based on the swipe and hold gesture.

10. The device of claim 1, wherein the indicator remains at a fixed position away from the edge of the display.

11. The device of claim 1, wherein the processor is further configured to:
    detect a second gesture on the touch-sensitive display;
    in response to detecting the second gesture:
        in accordance with a determination that the second gesture is a tap gesture, moving the two dimensional grid such that the portion of the two dimensional grid indicated by the tap gesture is moved to the indicator;
        in accordance with a determination that the second gesture is a flick gesture, moving the two-dimensional grid in a direction corresponding to the direction and velocity of the flick; and
        in accordance with a determination that the second gesture is a swipe and hold gesture, continually moving the two-dimensional grid in a direction corresponding to the direction of the swipe until the swipe and hold gesture is no longer detected.

12. The device of claim 1, wherein the processor is further configured to:
    detect an indicator gesture on the touch-sensitive display;
    in response to detecting the indicator gesture:
        in accordance with a determination that the indicator gesture is a tap gesture, moving the indicator to the portion of the two dimensional grid indicated by the tap gesture; and
        in accordance with a determination that the second gesture is a swipe gesture, moving the indicator in the direction of the swipe.

13. The device of claim 12, wherein the processor is further configured to, after moving the indicator in response to detecting an indicator gesture:
    determine whether the indicator is at the center of the display;
    in accordance with a determination that the indicator is at the center of the display, play at least of a portion of the currently indicated media file; and
    in accordance with a determination that the indicator is not at the center of the display:
        move the two dimensional grid towards the current position of the indicator
        while moving the two dimensional grid towards the current position of the indicator:
        detect a third gesture;
        in response to detecting the third gesture:
            in accordance with a determination that the detected third gesture is a tap gesture, moving the indicator to the center of the display and playing at least a portion of a media content file indicated by the tap gesture; and
            in accordance with a determination that the detected third gesture is a respective gesture that includes lateral movement of the contact, moving the indicator to a position indicated by the respective gesture.

14. The device of claim 1, wherein the indicator remains at a fixed position away from the edge of the display.

15. A method comprising:
    displaying, on a touch-sensitive display, a user-interface including an indicator and a two-dimensional grid, the two-dimensional grid including a plurality of images and the indicator indicating a first image of the two-dimensional grid, wherein each image in the plurality of images corresponds to a media file in a plurality of media files;
    generating the user-interface for display on the touch-sensitive display,
    playing a first media file corresponding to the first image;
    detecting a first gesture on the touch-sensitive display, wherein the first gesture is a swipe gesture including motion directed toward a first edge of the display;
    in response to detecting the first gesture and while maintaining the position of the indicator away from the first edge of the display, simultaneously moving the two-dimensional grid displayed on the touch-sensitive display and the indicator; and
    playing a second media file corresponding to the second image.

16. The method of claim 15, further comprising:
    detecting a second gesture on the touch-sensitive display;
    continually moving the two-dimensional grid displayed on the touch-sensitive display in response to detecting the second gesture until a third gesture is detected on the touch-sensitive display; and
    playing a third media file corresponding to a third image indicated by the indicator after detecting the third gesture.

17. The method of claim 15, further comprising:
    detecting a second gesture on the touch-sensitive display;
    continually moving the two-dimensional grid displayed on the touch-sensitive display in response to detecting the second gesture until a third gesture is detected on the touch-sensitive display, such that the indicator indicates two or more images in the plurality of images during the continual movement of the two-dimensional grid;
    playing a portion of each media file corresponding to each image in the two or more images in-the plurality of images when the indicator indicates the corresponding image during the continual movement of the two-dimensional grid; and
    playing a third media file corresponding to a third image indicated by the indicator after detecting the third gesture.

18. The method of claim 17, wherein the second gesture is a swipe and hold gesture.

19. The method of claim 18, wherein the third gesture is a release of the hold gesture.

20. The method of claim 19, wherein the speed and direction of the continual movement of the two-dimensional grid is based on the swipe and hold gesture.

21. The method of claim 16, wherein the second gesture is a swipe and hold gesture.

22. The method of claim 21, wherein the third gesture is a release of the hold gesture.

23. The method of claim 22, wherein the speed and direction of the continual movement of the two-dimensional grid is based on the swipe and hold gesture.

24. The method of claim 15, wherein the two-dimensional grid is repeated such that the two-dimensional grid has no end when moved on the touch-sensitive display.

25. The method of claim 15, wherein the indicator remains at a fixed position away from the edge of the display.

26. The method of claim 15, further comprising:
detecting a second gesture on the touch-sensitive display;
in response to detecting the second gesture:
in accordance with a determination that the second gesture is a tap gesture, moving the two dimensional grid such that the portion of the two dimensional grid indicated by the tap gesture is moved to the indicator;
in accordance with a determination that the second gesture is a flick gesture, moving the two-dimensional grid in a direction corresponding to the direction and velocity of the flick; and
in accordance with a determination that the second gesture is a swipe and hold gesture, continually moving the two-dimensional grid in a direction corresponding to the direction of the swipe until the swipe and hold gesture is no longer detected.

27. The method of claim 15, further comprising:
detecting an indicator gesture on the touch-sensitive display;
in response to detecting the indicator gesture:
in accordance with a determination that the indicator gesture is a tap gesture, moving the indicator to the portion of the two dimensional grid indicated by the tap gesture; and
in accordance with a determination that the second gesture is a swipe gesture, moving the indicator in the direction of the swipe.

28. The method of claim 27, further comprising, after moving the indicator in response to detecting the indicator gesture:
determining whether the indicator is at the center of the display;
in accordance with a determination that the indicator is at the center of the display, play at least of a portion of the currently indicated media file; and
in accordance with a determination that the indicator is not at the center of the display:
move the two dimensional grid towards the current position of the indicator
while moving the two dimensional grid towards the current position of the indicator:
detecting a third gesture;
in response to detecting the third gesture:
in accordance with a determination that the detected third gesture is a tap gesture, moving the indicator to the center of the display and playing at least a portion of a media content file indicated by the tap gesture; and
in accordance with a determination that the detected third gesture is a respective gesture that includes lateral movement of the contact, moving the indicator to a position indicated by the respective gesture.

29. A non-transitory computer-readable medium having stored thereon program instructions which, when executed by a processor, cause the processor to perform the following operations:
display, on a touch-sensitive display, a user-interface including an indicator and a two-dimensional grid, the two-dimensional grid including a plurality of images and the indicator indicating a first image of the two-dimensional grid, wherein each image in the plurality of images corresponds to a media file in a plurality of media files;
generate the user-interface for display on the touch-sensitive display,
play a first media file corresponding to the first image;
detect a first gesture on the touch-sensitive display, wherein the first gesture is a swipe gesture including motion directed toward a first edge of the display;
in response to detecting the first gesture and while maintaining the position of the indicator away from the first edge of the display, simultaneously move the two-dimensional grid displayed on the touch-sensitive display and the indicator such that the indicator indicates a second image of the two-dimensional grid; and
play a second media file corresponding to the second image.

30. The non-transitory computer-readable medium of claim 29, wherein the program instructions further cause the processor to:
continually move the two-dimensional grid displayed on the touch-sensitive display in response to detecting the second gesture until a third gesture is detected on the touch-sensitive display; and
play a third media file corresponding to a third image indicated by the indicator after detecting the third gesture.

31. The non-transitory computer-readable medium of claim 29, wherein the program instructions further cause the processor to:
detect a second gesture on the touch-sensitive display;
continually move the two-dimensional grid displayed on the touch-sensitive display in response to detecting the second gesture until a third gesture is detected on the touch-sensitive display, such that the indicator indicates two or more images in the plurality of images during the continual movement of the two-dimensional grid;
play of portion of each media file corresponding to each image in the two or more images in the plurality of images when the indicator indicates the corresponding image during the continual movement of the two-dimensional grid; and
play a third media file corresponding to a third image indicated by the indicator after detecting the third gesture.

32. The non-transitory computer-readable medium of claim 29, wherein the image corresponding to the media file is encoded in the media file.

33. The non-transitory computer-readable medium of claim 29, wherein the two-dimensional grid is repeated such that the two-dimensional grid has no end when moved on the touch-sensitive display.

34. The non-transitory computer-readable medium of claim 29, wherein the program instructions further cause the processor to:
- detect a second gesture on the touch-sensitive display;
- in response to detecting the second gesture:
  - in accordance with a determination that the second gesture is a tap gesture, moving the two dimensional grid such that the portion of the two dimensional grid indicated by the tap gesture is moved to the indicator;
  - in accordance with a determination that the second gesture is a flick gesture, moving the two-dimensional grid in a direction corresponding to the direction and velocity of the flick; and
  - in accordance with a determination that the second gesture is a swipe and hold gesture, continually moving the two-dimensional grid in a direction corresponding to the direction of the swipe until the swipe and hold gesture is no longer detected.

35. The non-transitory computer-readable medium of claim 29, wherein the program instructions further cause the processor to:
- detect an indicator gesture on the touch-sensitive display;
- in response to detecting the indicator gesture:
  - in accordance with a determination that the indicator gesture is a tap gesture, moving the indicator to the portion of the two dimensional grid indicated by the tap gesture; and
  - in accordance with a determination that the second gesture is a swipe gesture, moving the indicator in the direction of the swipe.

36. The non-transitory computer-readable medium of claim 35, wherein the program instructions further cause the processor to, after moving the indicator in response to detecting the indicator gesture:
- determine whether the indicator is at the center of the display;
- in accordance with a determination that the indicator is at the center of the display, play at least of a portion of the currently indicated media file; and
- in accordance with a determination that the indicator is not at the center of the display:
  - move the two dimensional grid towards the current position of the indicator
  - while moving the two dimensional grid towards the current position of the indicator:
    - detect a third gesture;
    - in response to detecting the third gesture:
      - in accordance with a determination that the detected third gesture is a tap gesture, moving the indicator to the center of the display and playing at least a portion of a media content file indicated by the tap gesture; and
      - in accordance with a determination that the detected third gesture is a respective gesture that includes lateral movement of the contact, moving the indicator to a position indicated by the respective gesture.

\* \* \* \* \*